(12) United States Patent
Dooley et al.

(10) Patent No.: US 8,072,113 B2
(45) Date of Patent: Dec. 6, 2011

(54) INDUCTANCE AUGMENTER FOR AN ELECTRIC MACHINE

(75) Inventors: Kevin Allan Dooley, Mississauga (CA); Joshua David Bell, Toronto (CA)

(73) Assignee: Pratt & Whitney Canada Corp., Longueuil, CA (US)

( * ) Notice: Subject to any disclaimer, the term of this patent is extended or adjusted under 35 U.S.C. 154(b) by 410 days.

(21) Appl. No.: 12/177,220

(22) Filed: Jul. 22, 2008

(65) Prior Publication Data

US 2010/0019605 A1 Jan. 28, 2010

(51) Int. Cl.
*H02K 1/12* (2006.01)
*H02K 1/00* (2006.01)
*H02K 19/26* (2006.01)

(52) U.S. Cl. ........ 310/190; 310/191; 310/180; 310/114; 310/113; 310/184; 310/254.1

(58) Field of Classification Search .................. 310/113, 310/114, 180, 184, 190, 191, 90.5, 254.1; H02K 1/12
See application file for complete search history.

(56) References Cited

U.S. PATENT DOCUMENTS

| | | | |
|---|---|---|---|
| 5,767,601 A * | 6/1998 | Uchiyama | 310/190 |
| 6,541,887 B2 * | 4/2003 | Kawamura | 310/190 |
| 6,700,279 B1 * | 3/2004 | Uchiyama et al. | 310/190 |
| 7,262,539 B2 | 8/2007 | Dooley | |
| 2002/0047448 A1 * | 4/2002 | Kawamura | 310/181 |
| 2006/0226721 A1 * | 10/2006 | Dooley et al. | 310/113 |
| 2007/0145850 A1 * | 6/2007 | Hsu | 310/156.56 |
| 2008/0019062 A1 | 1/2008 | Dooley | |
| 2011/0020153 A1 * | 1/2011 | Murakami | 417/410.1 |
| 2011/0025154 A1 * | 2/2011 | Nussbaumer | 310/90.5 |

* cited by examiner

*Primary Examiner* — Quyen Leung
*Assistant Examiner* — Terrance Kenerly
(74) *Attorney, Agent, or Firm* — Norton Rose OR LLP

(57) ABSTRACT

The electric machine comprises a rotor and stator, the rotor and stator having generally equal axial lengths. The stator has at least one primary and at least one control winding disposed around the stator. The electric machine comprises a stator extension of a magnetic material. The stator extension is disposed coaxially with the stator and has only the at least one control winding wrapped therearound. The stator extension extends axially adjacent the stator beyond an axial terminus of the rotor and defines a magnetic circuit around the at least one control winding. The stator extension is configured such that in use, the magnetic circuit remains unsaturated thereby increasing inductance of at least one control winding in an electric alternator/motor.

19 Claims, 4 Drawing Sheets

FIG_2

INDUCTANCE AUGMENTER FOR AN ELECTRIC MACHINE

TECHNICAL FIELD

The technical field relates to electric machines, and in particular to the control of such machines.

BACKGROUND

The output voltage and frequency of permanent magnet (PM) alternators are essentially determined by the rotor speed, which present challenges where the rotor speed cannot be independently controlled, such as in a gas turbine engine. Also, controllability in low- or no-load conditions may require using a regulation apparatus, such as a shunt regulation system, to draw current from the machine if the voltage increases above a given maximum allowable value. But these systems add weight and complexity. Instead, in one solution presented in U.S. Pat. No. 7,262,539, a set of control windings is provided around a portion of the stator.

The number of control winding turns generally sets the desired inductance of the control windings. However, the number of turns and the inductance can be the subject of conflicting requirements for designers. For example, a lower number of turns can be desirable to minimize voltage loss and reduce heating. However, increasing the number of turns to increase the inductance may be desirable to minimize current ripple or for other benefits. To date, the designers must sometimes make hard choices in optimizing inductance and machine performance, especially where the machine is used as both a generator and a motor. Room for improvement thus exists.

SUMMARY

In one aspect, the present concept provides an electric machine comprising: a rotor and stator, the rotor and stator having generally equal axial lengths, the stator having at least one primary and at least one control winding disposed around the stator; and a stator extension of a magnetic material, the stator extension disposed coaxially with the stator, the stator extension having only the at least one control winding wrapped therearound, the stator extension extending axially adjacent the stator beyond an axial terminus of the rotor, the stator extension defining a magnetic circuit around the at least one control winding, the stator extension configured such that in use the magnetic circuit remains unsaturated thereby increasing inductance of at least one control winding in an electric alternator/motor.

In another aspect, the concept provides an electric machine comprising: a rotor; a stator having a plurality of first slots and a plurality of second slots, the first slots being located on a periphery of the stator adjacent to the rotor, the second slots being located on an opposite side of the first slots relative to the rotor; at least a first winding disposed in a plurality of said first and second slots; at least a first magnetic circuit, defined in the stator and the rotor, encircling at least one first slot in which the first winding is disposed; at least a second magnetic circuit encircling at least one of the second slots in which the first winding is disposed, the second magnetic circuit sharing a common portion of the stator with the first magnetic circuit and including a magnetically saturable portion distinct from the common portion; a stator extension coaxial with the stator and extending axially beyond the rotor, the stator extension having slots in registry with corresponding ones of the second slots; at least a second winding disposed adjacent to the first winding in a plurality of said second slots and in their corresponding slots in the stator extension; a third magnetic circuit defined in the stator and including the magnetically saturable portion of the stator, the third magnetic circuit operatively associated with a current passing through the second winding; and a fourth magnetic circuit defined in the stator extension, the fourth magnetic circuit operatively associated with the current passing through the second winding for increasing inductance in the electric machine.

In another aspect, the concept provides an electric machine comprising: a rotor and a stator, the stator having a plurality of first slots and a plurality of second slots, the second slots being located on an opposite side of the first slots relative to the rotor; at least one power winding disposed in the first and second slots; at least one control winding disposed adjacent to the power winding in the second slots and around a magnetically saturable portion of the stator; and means for increasing inductance of the control winding regardless of saturation in the magnetically saturable portion.

In another aspect, the concept provides a method of controlling an electric machine having at least one power winding and at least one control winding, the machine also having first, second and third magnetic circuits and a control device, the first magnetic circuit including a rotor and encircling at least a first portion of the power winding, the second magnetic circuit encircling at least a second portion of the power winding remote from the first magnetic circuit and at least a portion of the control winding, the first and second magnetic circuits coupled when current flows in the power winding, the second magnetic circuit including a portion which is selectively magnetically saturable using the third magnetic circuit, the method comprising: maintaining a minimum inductance in the control winding when the magnetically saturable portion is at a fully saturated level; and controlling at least one among an output voltage and an output current of the electric machine using the control device regardless of the saturation level of the magnetically saturable portion.

BRIEF DESCRIPTION OF THE FIGURES

For a better understanding and to show more clearly how the present concepts may be carried into effect, reference will now be made by way of example to the accompanying figures, in which.

DETAILED DESCRIPTION

Figure 1:
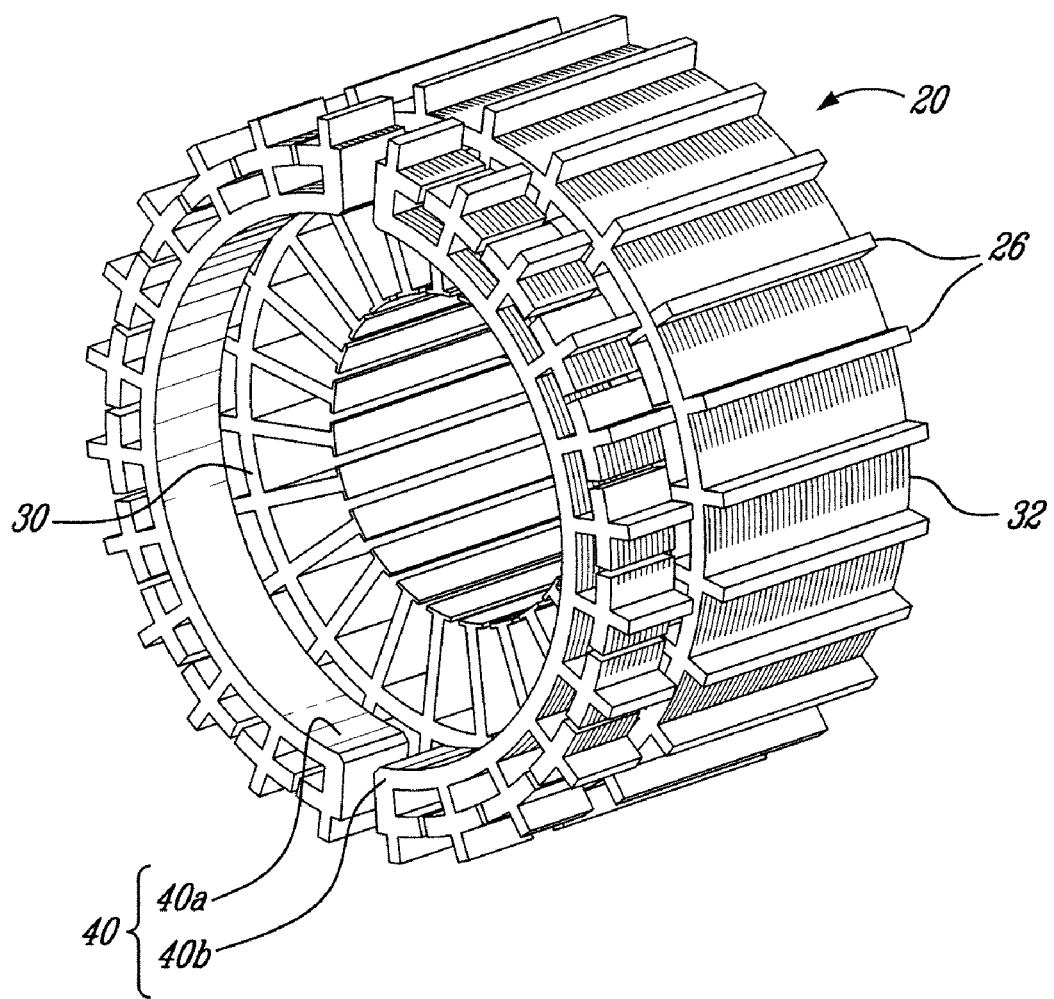
FIG. 1 is an isometric view of an example of an inductance augmenter that is used with an electric machine stator.

FIG. 1 illustrates a stator 20 generally in accordance with U.S. Pat. No. 7,262,539, the contents of which patent are hereby fully incorporated by reference into this application. Briefly, stator 20 comprises teeth 26, extending from a back iron or control flux bus 32, through a primary flux bus 30. Windings 22 and 24 (see FIG. 3) are provided on the stator 20 (and the stator extension 40, as will be described further below), about an inside rotor (not indicated). Other details are available in U.S. Pat. No. 7,262,539, and need not be repeated here.

When the electric machine 10 is used as a motor, and is driven using for instance the techniques disclosed in co-pending U.S. patent application Ser. No. 11/964,123, inductance in the control circuit is used as part of a buck regulation circuit of the drive architecture. It can also be used as part of a buck regulator, using for instance the technique described in U.S. patent publication No. 20080019062 published Jan. 24, 2008. Because of the use of the inductance of the control windings 24 as a filter component of the buck regulator, it is desirable to always maintain the inductance above a minimum value.

Referring again to FIG. 1, an example of an inductance augmenter arrangement is provided in the form of a coaxial stator extension 40 juxtaposed to the side of the stator 20 and is therewith. It has a shape and cross section complementary to that of the stator 20 for receiving a control winding 24, as will be described further below. The stator extension 40 of the illustrated example has two distinct segments 40a, 40b, to thereby provide a "dual channel" configuration of the type described in U.S. Pat. No. 7,262,539. Segments 40a, 40b are separated by air spaces 41 at both ends. Although a two-part inductance augmenter 40 is shown, other designs are also possible. Each segment 40a, 40b corresponds to a distinct machine side. It is also possible that only one side of the electric machine 10 be provided with a stator extension segment. Still, it is possible to provide less that all control windings 24 on the stator extension 40.

Figure 2:
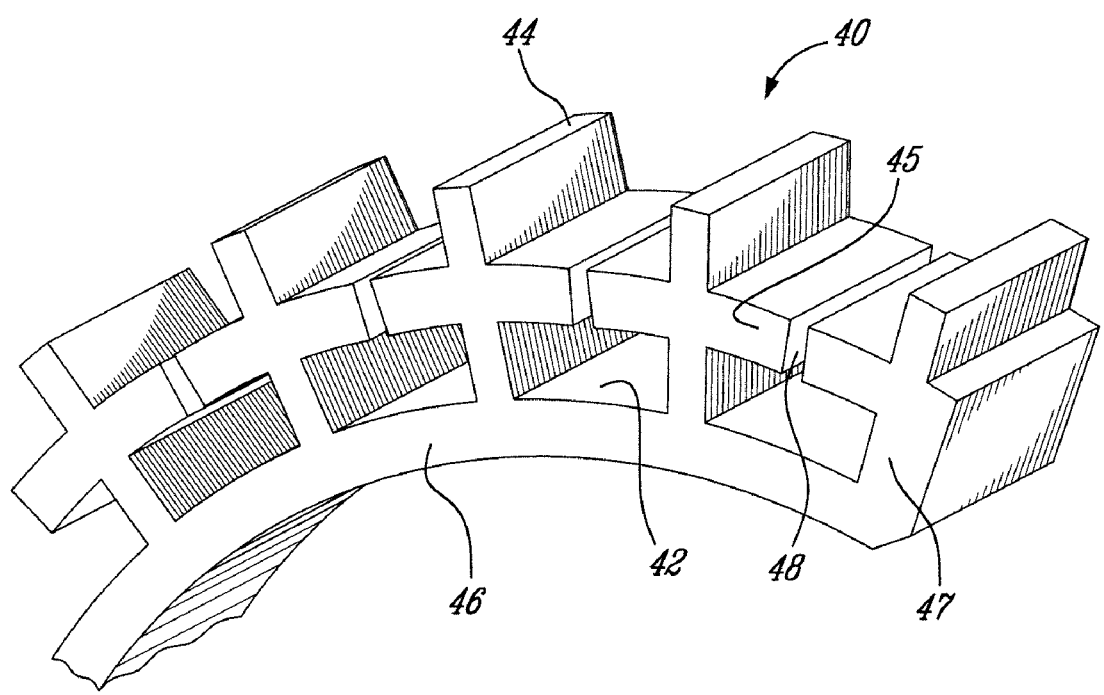
FIG. 2 is an enlarged view of some of the slots in the inductance augmenter of FIG. 1.

As shown in FIG. 2, the stator extension 40 has at least one row of slots 42 and has outer teeth 44 that are complementary to those of the stator 20. In the illustrated example, two concentric and spaced-apart annular members 45, 46 are provided. These annular members 45, 46 are segmented, however, since the stator extension 40 has two segments 40a, 40b. The inner annular member 46 of each segment of the stator extension 40 is also referred hereafter to as the solid flux bus. The slots 42 are separated from each other by a plurality of radially-extending walls 47. The outer-teeth 44 are in registry with the walls 47. Each slot 42 in the illustrated example also incorporates a discontinuity, in this case an individual air gap 48, across the entire width of the outer annular member 45, for preventing the flux density from reaching a saturation level in the stator extension 40 even though the control flux bus 32 in the stator 20 is fully saturated, as will be described further below. Stator extension 40 may also be provided without air gaps 48 and use, for instance, a material having a lower magnetic permeability than that of the magnetically saturable portion of the control flux bus 32 in the stator 20.

Figure 3:
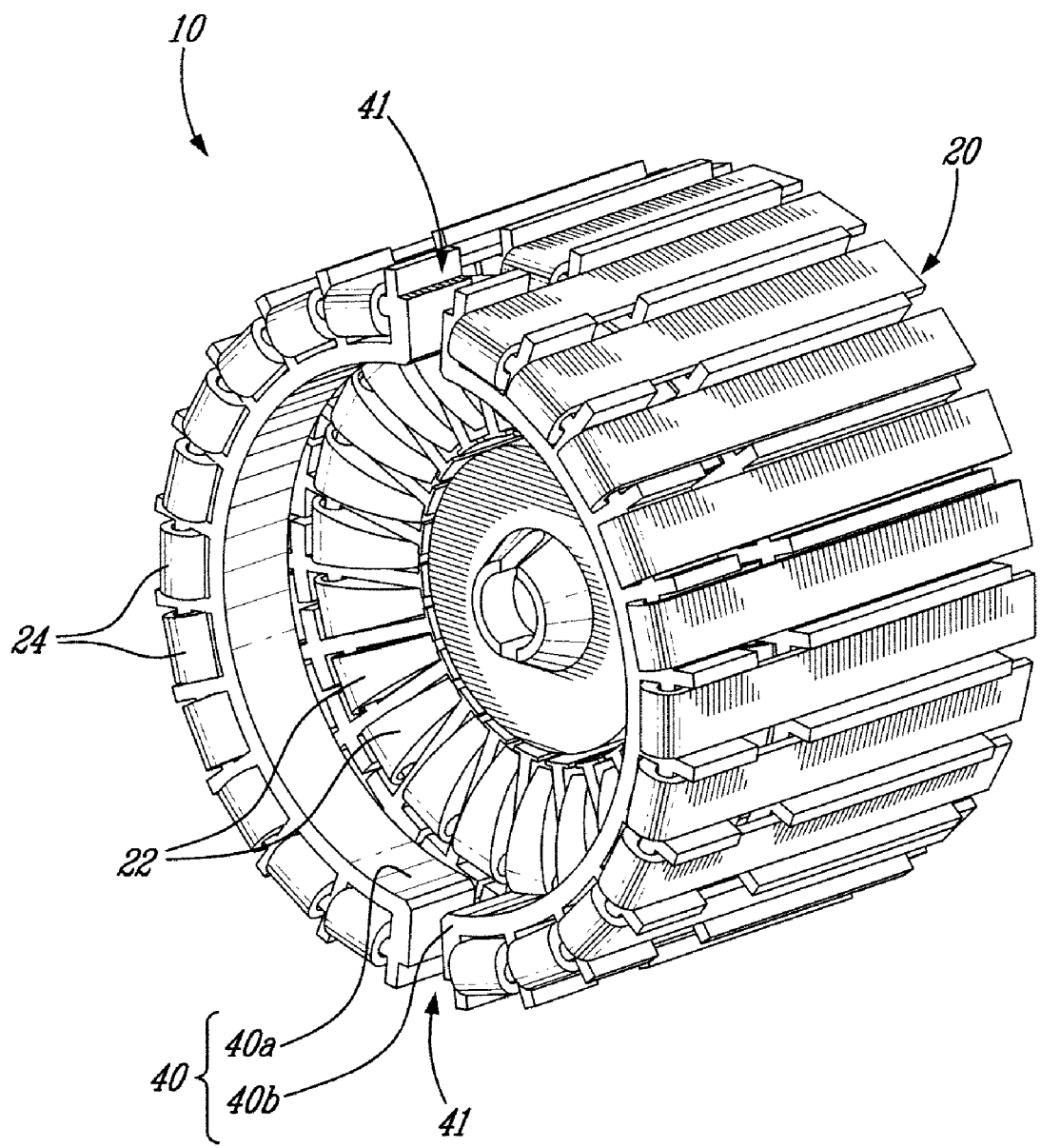
FIG. 3 is an isometric view showing the stator control windings extending around the inductance augmenter and the stator of FIG. 1.

FIG. 3 shows the electric machine 10 as assembled with the stator extension 40. As is apparent from FIG. 3, the rotor and stator generally have the same axial length, and thus the stator extension 40 causes the control windings 24 thereon to extend well beyond the end of the rotor. The increase provided by stator extension 40, discussed further below, in the non-saturable inductance is directly proportional to the length of the stator extension 40. The skilled reader will appreciate that inductance is directly proportional to the magnetic cross section, (i.e. magnetic circuit cross-sectional area) which is proportional to stator extension 40 length. The stator extension 40 is provided on one or both sides of the stator 20 and the control windings 24 are wound thereon. The stator extension 40 is thus formed as a part of the electric machine 10. The machine 10 and stator extension 40 may share the same cooling system and use the same coils as control windings 24. This may reduce the overall weight, improves efficiency, reduces the size of the electronic system and reduces the part count.

In use, the basic operation inside the stator 20 in the electric machine 10 incorporating stator extension 40 is substantially similar to that shown and described in U.S. Pat. No. 7,262,539, with the exception that in use, a minimum inductance in the control winding 24 is maintained even when the magnetically saturable portion in the stator 20 is at a fully saturated level, as will now be described. Within the stator 20, first, second and third magnetic circuits are set up, as described in U.S. Pat. No. 7,262,539. The stator extension 40, however, generates a "fourth" magnetic circuit, as described with reference to FIG. 4 below, so as to increase the inductance of the control winding 24, particularly when the control winding 24 is operated at a high saturation current level required to minimize the power winding inductance or inductive reactance. The stator extension 40 is arranged such that it remains unsaturated at currents normally capable of fully saturating the control flux bus 32. In this way, a minimum inductance in the control winding circuit can be maintained even when the control flux bus 32 is fully saturated, and this additional inductor remains as a part of the machine assembly and control winding 24 structure within the machine 10, as opposed to being a separately provided inductor. The stator extension 40 increases the inductance of the control windings 24 compared to the inductance of the control windings of a machine without it, for a given current through the control windings 24 provided from the source. Thus, the inductance augmenter arrangement increases the inductance regardless of the saturation level of the magnetically saturable portion.

Figure 4:
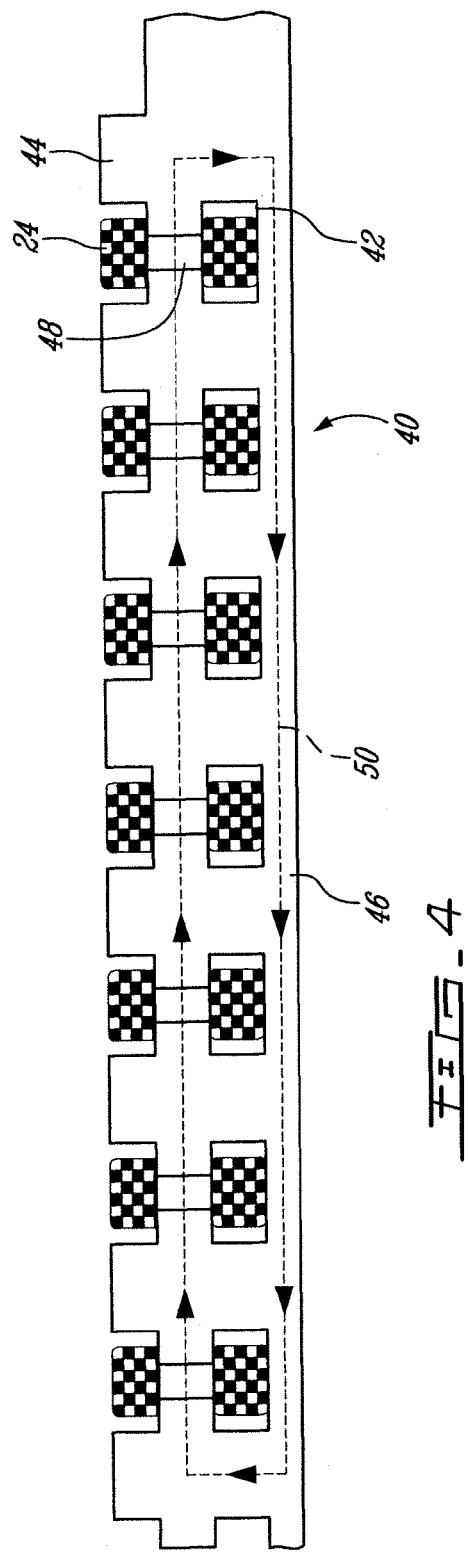
FIG. 4 is a somewhat schematic radial cross-sectional view of a portion of the inductance augmenter.

FIG. 4 shows an example of the magnetic circuit 50 inside a portion of the stator extension 40. As can be seen, the magnetic path between both sides of the control windings 24—one side corresponding to the upper (inner) slot row in the figure and the other side corresponding to the bottom (outer) slot row—adds to the magnetic flux circulating in the third magnetic circuit in the stator 20. The magnetic path crosses the air gaps 48 in FIG. 4. It should be noted that the width of the air gaps 48 are larger for the purpose of illustration, and in practice are only as large as need be to provide the desired effect. The portion of the stator extension 40 between the two sides of the control windings 24 is in registry with the control flux bus 32 of the stator 20.

The stator extension 40 may be provided on one or both sides of the stator 20, and the control windings 24 are wound thereon. The new magnetic path(s) formed around the slots 42 results in a significant increase in the inductance of the control windings 24, particularly when the control flux bus 32 is saturated. The stator extension 40 increases the inductance of the end turn section of the control winding 24 without saturating the stator 20 at the highest control current required for normal operation of the machine 10.

When the machine 10 is used as a motor, and is driven using the techniques disclosed in applicant's co-pending application Ser. No. 11/420,602, filed May 26, 2006 (the entire contents of which are hereby fully incorporated by reference into this application), inductance in the control coil circuit is used as a part of a buck regulation circuit of the drive architecture, and in pending application Ser. No. 11/934,170, filed Nov. 2, 2007, (the entire contents of which are hereby fully incorporated by reference into this application), is used as a part of a buck regulator. Generally, when the machine is used in the motoring mode, the control winding current may be arranged such that the control flux bus 32 is saturated in both portions of the phase winding slots most of the time, in order to achieve the best performance (i.e. lowest possible reactance provides for the highest possible power factor). In the architectures referenced earlier in this paragraph, the control current and the phase current are effectively in series with each other, since the buck regulation circuit which uses the control coil inductance as a filter component, supplies the current delivered to the phase coils, and as such the control current and the phase current are always the same value except that the control current is always DC and the phase current is AC. Use of the control coil inductance as a filter component of the buck regulator is just one example where it becomes desirable to maintain the inductance of the control coil circuit above some minimum value, particularly when the control winding itself is at a saturated condition.

Figure 5:
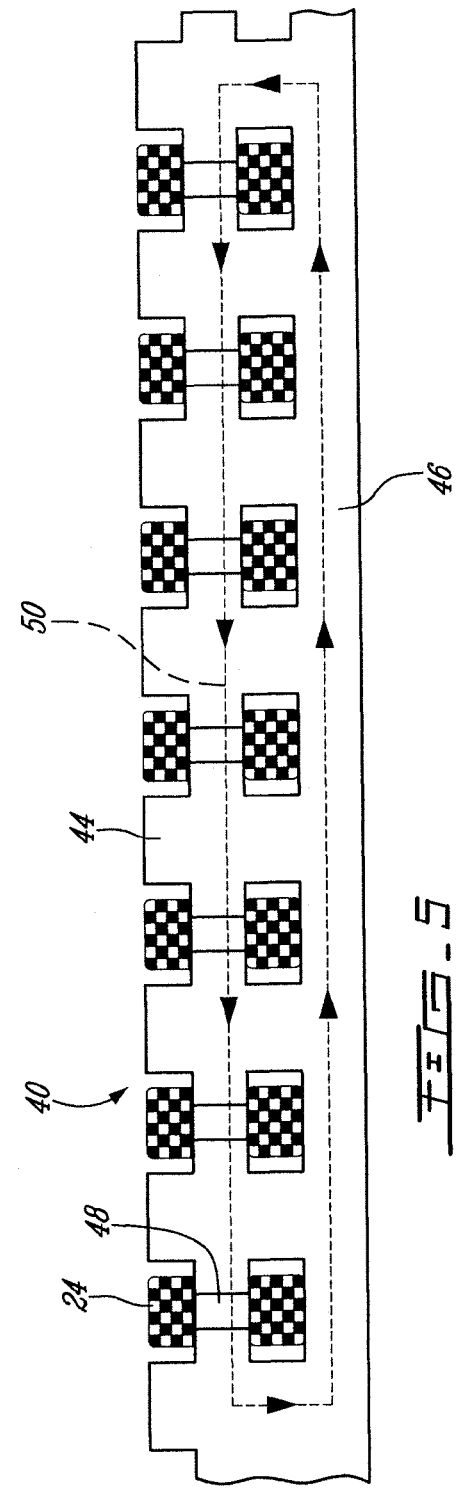
FIG. 5 is a view similar to FIG. 4, showing another example of an inductance augmenter.

FIG. 5 illustrates a portion of another example of a stator extension 40. The solid flux bus 46 is provided on the outside (corresponding to the bottom of the figure). However, the fourth magnetic circuit 50 is in the same direction as in FIG. 4. The fourth magnetic circuit 50 also crosses the air gaps 48. The teeth 44 are on the inside.

As can appreciated, the new magnetic path 50 formed around the slots 42 results in a significant increase in the inductance of the control winding 24 of the electric machine 10 and a minimum inductance remains when the control flux bus 32 is saturated. This can be very useful in a wide variety of applications, including when the electric machine 10 is used in a gas turbine engine.

Still other modifications which fall within the scope of the present description will be apparent to those skilled in the art, in light of a review of this disclosure, and such modifications are intended to fall within the appended claims. In this application, it is to be understood that the term 'alternator' is sometimes used generically to mean a device used for generating electricity, and is not always intended therefore to be limited to a device for generating an output alternating current. The electric machine needs not necessarily to be an alternator/motor, and can be exclusively an alternator or exclusively a motor. The rotor may include other arrangements that do not include permanent magnets. The rotor can also be designed as an outer rotor instead of an inside rotor as in the illustrated example. The stator extension does not need to be provided in two or more distinct sections. The discontinuities in the stator extension can include the presence of a non-magnetic material instead of an air gap. Other modifications can be devised as well.

What is claimed is:

1. An electric machine comprising:
  a rotor and stator, the rotor and stator having generally equal axial lengths, the stator having at least one primary and at least one control winding provided on the stator; and
  a stator extension of a magnetic material, the stator extension disposed coaxially with the stator, the stator extension having only the at least one control winding wrapped therearound, the stator extension extending axially adjacent the stator beyond an axial terminus of the rotor, the stator extension defining a magnetic circuit around the at least one control winding, the stator extension configured such that in use the magnetic circuit remains unsaturated thereby increasing inductance of the at least one control winding.

2. The electric machine as defined in claim 1, wherein the stator extension has at least one row of spaced-apart slots, each configured and disposed to cooperate with a corresponding one of the at least one control winding.

3. The electric machine as defined in claim 1, wherein the stator extension has a discontinuity in the magnetic circuit configured to increase a saturation level of the circuit.

4. The electric machine as defined in claim 1, wherein the at least one control winding is provided in a plurality of adjacent loops about the circumference of the stator and the stator extension, and wherein said magnetic circuit is provided in the stator extension about each said loop.

5. The electric machine as defined in claim 4 wherein the stator extension comprises radial teeth separating each said loop.

6. The electric machine as defined in claim 1, wherein the stator extension comprises an inner and an outer annular member, each defining a portion of the at least one row of slots, the inner and the outer annular member being substantially concentric, the slots being separated from each other by a plurality of radially-extending walls connected to the inner and outer annular members.

7. The electric machine as defined in claim 6, wherein one among the first and the second annular member has a discontinuity in each slot.

8. The electric machine as defined in claim 7, wherein each discontinuity comprises an air gap across an entire width of the first or the second annular member.

9. The electric machine as defined in claim 6, further comprising a plurality of radially-extending teeth provided on the outer annular member, each tooth being in registry with a corresponding one of the radially-extending walls.

10. The electric machine as defined in claim 1, wherein the stator extension is provided in at least two spaced-apart distinct segments.

11. An electric machine comprising:
  a rotor;
  a stator having a plurality of first slots and a plurality of second slots, the first slots being located on a periphery of the stator adjacent to the rotor, the second slots being located on an opposite side of the first slots relative to the rotor;
  at least a first winding disposed in a plurality of said first and second slots;
  at least a first magnetic circuit, defined in the stator and the rotor, encircling at least one first slot in which the first winding is disposed;
  at least a second magnetic circuit encircling at least one of the second slots in which the first winding is disposed, the second magnetic circuit sharing a common portion of the stator with the first magnetic circuit and including a magnetically saturable portion distinct from the common portion;
  a stator extension coaxial with the stator and extending axially beyond the rotor, the stator extension having slots in registry with corresponding ones of the second slots;
  at least a second winding disposed adjacent to the first winding in a plurality of said second slots and in their corresponding slots in the stator extension;
  a third magnetic circuit defined in the stator and including the magnetically saturable portion of the stator, the third magnetic circuit operatively associated with a current passing through the second winding; and
  a fourth magnetic circuit defined in the stator extension, the fourth magnetic circuit operatively associated with the current passing through the second winding for increasing inductance in the electric machine.

12. The electric machine as defined in claim 11, wherein the fourth magnetic circuit crosses an air gap provided in the stator extension.

13. The electric machine as defined in claim 11, wherein the stator extension has a discontinuity in the magnetic circuit configured to increase a saturation level of the circuit.

14. The electric machine as defined in claim 11, wherein the control winding is provided in a plurality of adjacent loops about the circumference of the stator and the stator extension, and wherein said fourth magnetic circuit is provided in the stator extension about each said loop.

15. The electric machine as defined in claim 14 wherein the stator extension comprises radial teeth separating each said loop.

16. An electric machine comprising:
   a rotor and a stator, the stator having a plurality of first slots and a plurality of second slots, the second slots being located on an opposite side of the first slots relative to the rotor;
   at least one power winding disposed in the first and second slots;
   at least one control winding disposed adjacent to the power winding in the second slots and around a magnetically saturable portion of the stator; and
   a stator extension of a magnetic material and disposed coaxially with the stator wherein the control winding is wrapped around the stator extension.

17. The electric machine as defined in claim 16, wherein the control winding extends in length beyond a rotor length on at least one side of the stator.

18. A method of controlling an electric machine having at least one power winding and at least one control winding provided on a stator, the control winding being wrapped around a stator extension of a magnetic material disposed coaxially with the stator, the machine also having first and second magnetic circuits, the first magnetic circuit including a rotor and encircling at least a first portion of the power winding, the second magnetic circuit encircling at least a second portion of the power winding remote from the first magnetic circuit and at least a portion of the control winding, the first and second magnetic circuits coupled when current flows in the power winding, the second magnetic circuit including a portion which is selectively magnetically saturable, the method comprising:
   saturating the selectively magnetically saturable portion by supplying current to the control winding; and
   maintaining the stator extension magnetically un-saturated to maintain an inductance in the control winding above a minimum value when the magnetically saturable portion is at a fully saturated level.

19. The method as defined in claim 18, wherein maintaining an inductance includes increasing the inductance in the control winding regardless of the saturation level of the magnetically saturable portion.

* * * * *